US008888570B2

(12) United States Patent
Doyle

(10) Patent No.: US 8,888,570 B2
(45) Date of Patent: Nov. 18, 2014

(54) COMBINATION HANDHELD MEAT TENDERIZER AND MARINADE INJECTOR

(75) Inventor: William Doyle, Waltham, MA (US)

(73) Assignee: Doyle Engineering, Inc., Waltham, MA (US)

( * ) Notice: Subject to any disclaimer, the term of this patent is extended or adjusted under 35 U.S.C. 154(b) by 0 days.

(21) Appl. No.: 13/451,219

(22) Filed: Apr. 19, 2012

(65) Prior Publication Data

US 2012/0270485 A1 Oct. 25, 2012

Related U.S. Application Data

(60) Provisional application No. 61/476,851, filed on Apr. 19, 2011.

(51) Int. Cl.
*A22C 9/00* (2006.01)

(52) U.S. Cl.
CPC ............... *A22C 9/001* (2013.01); *A22C 9/008* (2013.01)
USPC .......................................... 452/144; 452/141

(58) Field of Classification Search
USPC .................... 452/141, 144, 146, 147
See application file for complete search history.

(56) References Cited

U.S. PATENT DOCUMENTS

| | | | | |
|---|---|---|---|---|
| 1,220,970 A * | 3/1917 | Frohmann | ....................... | 452/30 |
| 2,656,785 A * | 10/1953 | Gannon et al. | .................. | 99/532 |
| 3,344,731 A * | 10/1967 | Trees | ................................ | 99/533 |
| 3,441,980 A * | 5/1969 | Defenbaugh | .................. | 452/146 |
| 3,581,651 A * | 6/1971 | Johnson | .......................... | 99/535 |
| 3,661,072 A * | 5/1972 | Allinquant et al. | ............. | 99/532 |
| 3,734,001 A | 5/1973 | Poster | | |
| 3,779,151 A * | 12/1973 | Ross | ............................... | 99/533 |
| 4,182,002 A * | 1/1980 | Holec | .............................. | 99/532 |
| 4,199,841 A | 4/1980 | Jaccard | | |
| 4,254,700 A | 3/1981 | Fleming | | |
| 4,257,144 A * | 3/1981 | Takegoshi et al. | ............. | 452/146 |
| 4,463,476 A | 8/1984 | Jaccard | | |
| 4,680,832 A * | 7/1987 | Langen | ........................... | 99/532 |
| 4,690,046 A * | 9/1987 | Corominas | ..................... | 99/533 |
| 4,864,922 A * | 9/1989 | Higashimoto | ................... | 99/533 |
| 4,953,456 A * | 9/1990 | Prosenbauder | ................. | 99/533 |
| 5,383,814 A | 1/1995 | Jaccard | | |
| 5,507,221 A * | 4/1996 | Lagares-Corominas | ....... | 99/532 |
| 5,593,346 A * | 1/1997 | Washington | .................. | 452/146 |
| 5,605,093 A * | 2/1997 | Higashimoto | ................... | 99/533 |
| 5,934,187 A * | 8/1999 | Leon | ............................... | 99/516 |
| 6,658,990 B1 * | 12/2003 | Henning et al. | ................ | 99/352 |

* cited by examiner

*Primary Examiner* — David Parsley
(74) *Attorney, Agent, or Firm* — Pepper Hamilton LLP

(57) ABSTRACT

An improved meat tenderizing appliance for domestic use in which both mechanical and chemical tenderizing processes are implemented in an easily cleaned, handheld unit operated by the mechanical movement of the device. A small pump is operated through the downward motion of the device. Pressure generated from the pump, as a result of the downward motion, forces the injection solution through a manifold of specially designed needles that administer micro-cuts into the meat and inject the solution. The needles are designed as heavy duty stainless steel with flutes that have sharp edges to produce the micro-cuts in the meat and to strengthen the needle.

9 Claims, 2 Drawing Sheets

SECTION A-A

SECTION A-A

SECTION B-B

COMBINATION HANDHELD MEAT TENDERIZER AND MARINADE INJECTOR

CROSS-REFERENCE TO RELATED APPLICATIONS

This application claims the priority benefit of U.S. Provisional Patent Application No. 61/476,851 filed Apr. 19, 2011 and entitled "Combination Handheld Meat Tenderizer and Marinade Injector," the content of which is hereby incorporated by reference in its entirety.

BACKGROUND

It has been a commercial and domestic practice to either mechanically or chemically tenderize and add flavor to meat through various different methods including: pounding; piercing; injecting; marinating and basting. Commercial processes include large machines capable of processing large quantities of meat through an industrial process not practical for domestic use. Typical domestic processes include specialty devices that pierce the meat to tenderize it or use dimpled hammers that pound the meat to tenderize it, followed by marinating in a solution for a period of time. The two basic processes described are intended to break-down meat fibers and create a more tender, flavorful meat.

Most commercially processed meats undergo some type of tenderizing process similar to those described above. Most of the commercial processes include basting/marinating solutions that contain preservatives, sodium, coloring and flavorings, some of which are that may be considered unhealthy.

A domestic application of the above commercial processes that an individual can use to both mechanically and chemically tenderize and marinade a variety of meats would be something that is desirable. While there are several devices that currently exist, as described in U.S. Pat. No. 4,254,700 to Flemming, U.S. Pat. No. 5,383,814 to Jaccard, U.S. Pat. No. 4,463,476 to Jaccard, U.S. Pat. No. 3,734,001 to Poster, all of these patents describe either mechanical or chemical tenderizing either as a commercial or domestic application. However, none of these patents apply both a mechanical and a chemical process in a single domestic application.

In U.S. Pat. No. 4,254,700 to Flemming, the appliance is used for pre-basting, seasoning and tenderizing meat and poultry. The appliance comprises in a single hand held unit, one or more hollow needles through which liquid such as baste or tenderizer is injected into the meat or poultry, a reservoir which accommodates the liquid and an electrically operated pump, which pumps the liquid from the remote reservoir through the injection needles.

In U.S. Pat. No. 4,199,841 to Jaccard, the invention is a hand held meat tenderizer which creates a plurality of incisions that are made simultaneously in a meat cut utilizing a plurality of penetrating or piercing blade elements with a stripping plate intended to retract the blade elements and remove the meat from the device.

In U.S. Pat. No. 5,383,814 to Jaccard, the invention involves a powered handheld meat tenderizer. The tenderizer has features that provide easy access to the blades for cleaning, oiling and blade replacement. Since a motor provides the energy to move the blades in an up and down motion, little, if any manual pressure is required during the tenderizing process. The blades are movably attached to the power source and are easily activated by a trigger or other activating means similar to those used on an electric drill.

The present device described in this disclosure combines the two meat preparation processes of tenderizing and basting, including an efficient method of infusing marinade solutions in a simple handheld device for domestic use, while overcoming the inherent drawbacks of prior art.

SUMMARY

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this document is to be construed as an admission that the embodiments described in this document are not entitled to antedate such disclosure by virtue of prior invention. As used in this document, the term "comprising" means "including, but not limited to."

The present device is a meat tenderizing device comprising a hollow handle marinade solution reservoir, a hollow manifold having a plurality of fluted injection needles with sharpened edges, a pump cylinder and a release plate. The injection needles are positioned on the manifold to pass through the movable release plate located below the manifold in a reciprocating motion. The release plate is connected to the pump shaft. By pushing the device into the meet repeatedly, the needles physically tenderize the meat by administering micro-cuts into the meat via the sharpened point and the sharpened flutes of the needle. The action of penetrating the meat pushes the spring actuated release plate into the device thus compressing the pump cylinder and subsequently pressurizing the hollow manifold and handle. The pressure within the manifold and handle forces marinade solution from the manifold and handle through the fluted needles and into the meat. The release plate and added hydrostatic pressure of the injected marinade solution assist with removing the needles from the meat. The repeated process described above further physically separates and scores the meat fibers allowing the injected marinade solution to chemically tenderize the meat.

In a particular embodiment, the device comprises a housing configured to hold a quantity of marinade; a lower body needle manifold removably attached to the housing; a pump cylinder fitted within the housing; a release plate attached to a pump shaft, the pump shaft configured to fit within the pump cylinder; and a plurality of fluted needles, the needles removably attached to the lower body needle manifold and configured to simultaneously tenderize and inject marinade into a piece of meat.

BRIEF DESCRIPTION OF THE DRAWINGS

The above and other objects of the present invention will become more readily apparent from the following detailed description taken in connection with the accompanying drawing which.

DETAILED DESCRIPTION

It is a principal object of the present disclosure to provide an apparatus for domestic use in both mechanically and chemically tenderizing various meats by pounding and injecting any desired marinade solution. It is a further objective to provide such apparatus which does not require high pressure, hot water, electricity or refrigeration in its operation as do prior art commercial apparatus of a similar nature. It is a further objective of this disclosure to provide a specially designed fluted injection needle that further tenderizes the meat mechanically by creating micro-cuts at the point of the needle incision and at the point where the marinade solution is injected. It is another object to provide such apparatus which is easily disassembled for cleaning.

Figure 1:
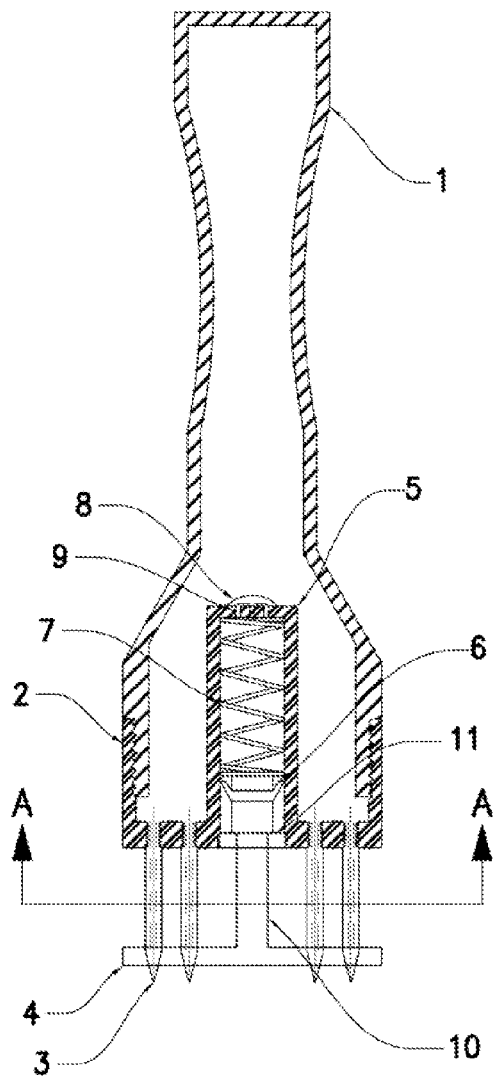
FIG. 1 illustrates a vertical cross section view of the symmetrical cylindrical device with a section showing a horizontal view according to an embodiment.
Figure 1:
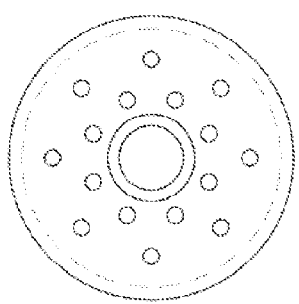
Figure 2:
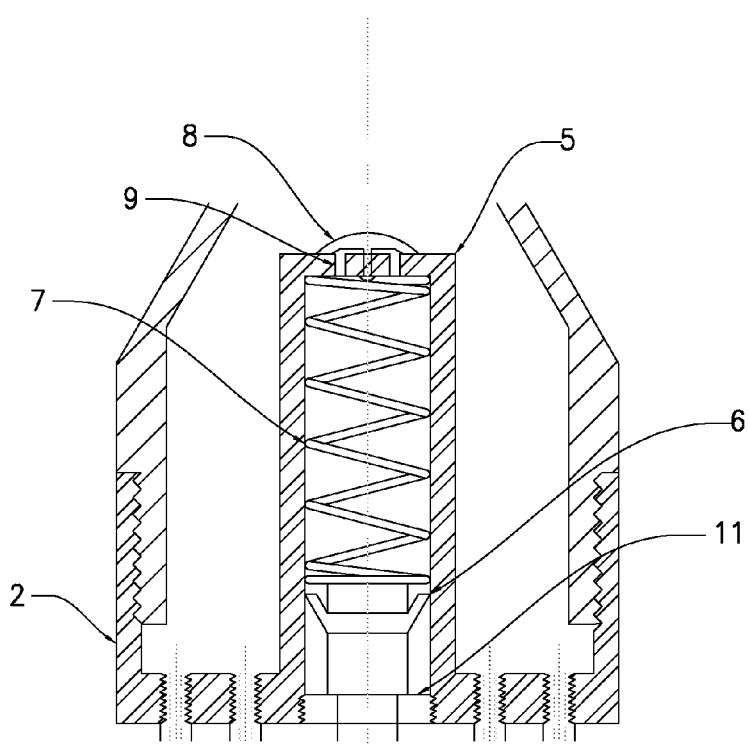
FIG. 2 illustrates an enlargement of the internal components according to an embodiment.
Figure 3:
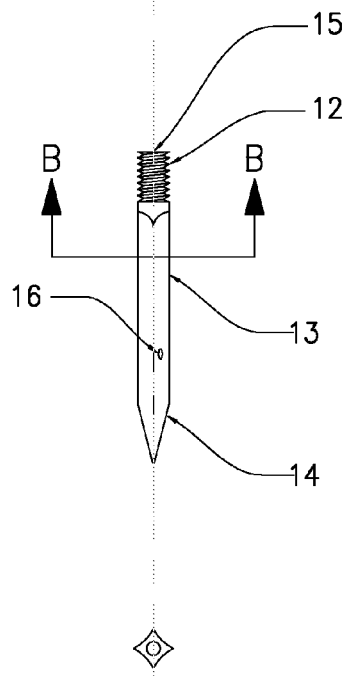
FIG. 3 illustrates an enlargement of a vertical cross section of an individual fluted injection needle with cross section illustrating the sharpened fluted edges according to an embodiment.

Referring to the drawings, FIGS. 1, 2 and 3 illustrates various views of one particular embodiment of a combination meat tenderizer and baste injector. FIG. 1 shows a cross-section view of the entire device. The device may include, in combination, a housing 1 formed into a handle portion, a lower body needle manifold 2 the pump cylinder 5 and a release plate 4. The housing 1 may be ergonomically formed to fit the contours or a human hand, including ridges of other textured protrusions (not shown in FIG. 1) for increasing the comfort or grip of a user of the device. The housing 1 may be slotted, threaded or otherwise grooved to receive at least a portion of the lower body needle manifold 2 such that the lower body needle manifold is removably attached to the housing. Similarly, the housing 1 may be shaped to accept the pump cylinder 5, providing an interior spacing for the pump cylinder.

The pump cylinder 5 may be shaped to accept at least a portion of a pump shaft 10, the pump shaft being connected to the release plate 4 such that as a user of the device presses down on the housing 1, the release plate contacts the meat being treated and, as the housing moves toward the meat (as a result of applied force by the user), at least a portion of the pump shaft moves within the pump cylinder.

FIG. 2 illustrates additional detail of the lower body needle manifold 2. The pump shaft 10 may include a pump plunger 6 configured to abut a compression spring 7, as well as a retaining ring 11 for preventing any marinade, blood, or other contaminant from entering the pump cylinder during use. During use, the compression spring 7 may oppose movement of the pump shaft 10, thereby adding a resistive feel for the user during use and preventing the user from tenderizing the meet too quickly. The compression spring 7 may also provide a return force against the pump plunger 6 when the user removes their applied force, thereby causing the pump shaft to return to its original position. It should be noted that a compression spring is shown herein by way of example only. Additional resistive components may be used, such as a pneumatic compression device.

The outside of the pump cylinder 5 may also include a one-way flexible valve 8 that covers one or more holes 9. This arrangement may provide for the release of air or any other material contained within the pump cylinder 5 during use of the device.

As shown in FIG. 3, attached to the lower body needle manifold 2 may be hollow fluted tenderizing injection needles 3. The hollow fluted injection needles may include a threaded connection hub 12, a fluted and sharpened cannula 13, a sharpened four-sided trocar point 14 and a hollow interior 15 with injection port slot 16. The fluted and sharpened cannula 13 may be configured to provide strength and rigidity to the needles 3 while reducing weight and size of the needles.

In particular, the threaded connection hub 12 may be configured to fit within threaded holes in the lower body needle manifold 2 such that the needles 3 are removably attached to the device. The point 14 may be configured to pierce and tenderize the meat, while the hollow interior 15 and injection port slot 16 provide fluid communication between an interior cavity or reservoir in the housing and the meat, thereby providing a path for marinade to reach and begin basting the meat.

To use the device as described herein, a user may remove the lower body needle manifold 2 from the housing 1, thereby opening the marinade reservoir space defined by the interior of the housing. The user may fill the reservoir with a liquid-based marinade and replace the lower body needle manifold 2, attaching the manifold to the housing 1 (e.g., by screwing the manifold to the housing). The user may attach (e.g., screw) one or more needles 3 onto the lower body needle manifold 2 as discussed above, screwing the threaded connection hub 12 into the threaded holes on the manifold. It should be noted that the needles 3 may already be attached to the lower body needle manifold 2 prior to attachment to the housing 1.

The user may then press the needles 3 into a piece of meat by applying a downward force on the housing 1, directed toward the meat. The four-sided trocar points 14 of the needles 3 may pierce the meat, creating a series of micro-cuts into the meat. As the needles 3 continued into the meat (through the continued pressure applied by the user), the release plate 4 may contact the meat as well. As the device continues toward the meat, the release plate 4 ceases to move and, instead, the pump shaft 10 begins moving into the pump cylinder 5. As the pump shaft 10 moves within the pump cylinder 5, the pump plunger 6 forces any air in the pump cylinder through holes 9 and one-way valve 8 and into the interior of the housing 1, thereby forming a mechanical pump in the housing and forcing the marinade through the hollow interiors 15 of the needles 3, through injection port slot 16 and into the meat, saturating into the micro-cuts and basting the meat.

This process may be repeated until the user is satisfied with the tenderness and basting of the meat, or until the marinade runs out (though the device can still continue to tenderize the meat after the marinade has been used). To clean the device, the user may remove the lower body needle manifold 2 from the housing 1, and each needle 3 from the manifold. The user may also remove the release plate 4 (and pump shaft 10) from the lower body needle manifold. As the device is configured to separate into multiple components, the user may more thoroughly clean and disinfect the device between uses.

The various components discussed herein may be constructed or manufactured from food safe materials, such as, but not limited to, various polymers and plastics, stainless steel, aluminum, and other related food safe materials. Similarly, the various components discussed herein may be constructed according to various manufacturing methods, including but not limited to, injection molding, milling, forging, extrusion, pressing, and other related manufacturing methods. For example, the housing 1 as discussed above may be constructed from various polymers and plastics (e.g., clear or opaque plastics), stainless steel or aluminum. Similarly, the needles 3 may be constructed from stainless steel or aluminum.

Variations of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A handheld device for tenderizing and basting meat, the device comprising:
    a housing configured to hold a quantity of marinade;
    a lower body needle manifold having a plurality of needles configured to pierce meat attached thereto, each of the plurality of needles comprising a hollow interior configured to provide a fluid path between the housing and the meat;
    a pump cylinder fitted within the housing;
    a release plate configured to move toward the housing as the plurality of needles pierces the meat and the meat presses against a first surface of the release plate, the release plate being configured to push a pump shaft attached to a second surface of the release plate opposite the first surface, the pump shaft being pushed within the pump cylinder toward the housing as the release plate moves toward the housing, thereby mechanically generating pressure within the pump cylinder responsive to movement of the release plate toward the housing; and
    a one-way valve connected to the pump cylinder and configured to open responsive to the pressure generated in the pump cylinder, the pressure generated in the pump cylinder forcing air to move out of the pump cylinder through the one-way valve and into the housing, thereby injecting at least a portion of the quantity of marinade through the plurality of needles and into the meat.

2. The device of claim 1, wherein the housing further comprises a reservoir for containing the quantity of marinade.

3. The device of claim 1, wherein the pump cylinder further comprises a compression spring configured to resist movement of the pump shaft as well as provide a return force to the pump shaft, thereby returning the release plate to an original position.

4. The device of claim 1, wherein the pump shaft comprises a plunger configured to provide a seal between the pump shaft and the pump cylinder such that, as the pump shaft moves through the pump cylinder, air is forced through the one-way valve.

5. The device of claim 1, wherein the housing is constructed from a food-safe material selected form the group of: various plastics and polymers, stainless steel, and aluminum.

6. The device of claim 1, wherein each of the plurality of needles is constructed from at least one of stainless steel and aluminum.

7. The device of claim 1, wherein the pump cylinder is integrated with the lower body needle manifold.

8. The device of claim 1, wherein each of the plurality of needles comprise a fluted needle.

9. The device of claim 1, wherein the lower body needle manifold is removably attached to the housing.

* * * * *